(12) United States Patent
Burton et al.

(10) Patent No.: US 6,443,202 B1
(45) Date of Patent: Sep. 3, 2002

(54) PROTECTIVE COATING FOR TIRE SIDEWALLS AND METHOD FOR PROTECTING TIRE SIDEWALLS

(75) Inventors: James J. Burton, White Bear Lake; James M. Duchaine, North Branch; Mortimer J. Huber, White Bear Lake, all of MN (US); Bharat K. Kansupada, Mogadore; Fredrick L. Magnus, Mogadore, both of OH (US)

(73) Assignees: Quality Manufacturing, Inc., St. Paul, MN (US); The Goodyear Tire and Rubber Company, Akron, OH (US)

( * ) Notice: Subject to any disclaimer, the term of this patent is extended or adjusted under 35 U.S.C. 154(b) by 0 days.

(21) Appl. No.: 09/397,990

(22) Filed: Sep. 16, 1999

Related U.S. Application Data

(60) Provisional application No. 60/100,636, filed on Sep. 16, 1998.

(51) Int. Cl.$^7$ ............................. B60C 13/00; C08J 3/20
(52) U.S. Cl. ..................... 152/524; 152/530; 524/501; 524/503; 524/506
(58) Field of Search .................... 152/524, 530, 152/DIG. 12; 524/502, 503, 501, 506, 529, 533, 445

(56) References Cited

U.S. PATENT DOCUMENTS

| | | | |
|---|---|---|---|
| 2,622,044 A | 12/1952 | Martens | 117/139 |
| 2,680,724 A | 6/1954 | Oppenheim | 260/23 |
| 3,114,650 A | 12/1963 | Oppenheim et al. | 117/6 |
| 3,442,845 A | 5/1969 | Columbus et al. | 260/29.6 |
| 4,161,565 A | 7/1979 | Hermann et al. | 428/437 |
| 4,347,266 A | 8/1982 | Norman et al. | 427/154 |
| 4,780,225 A | * 10/1988 | Mowdood et al. | 252/28 |
| 4,911,218 A | 3/1990 | Patitsas | 152/525 |
| 4,967,819 A | 11/1990 | Kansupada | 152/524 |
| 5,058,648 A | 10/1991 | Kansupada | 152/524 |
| 5,137,070 A | 8/1992 | Kansupada et al. | 152/524 |
| 5,143,949 A | 9/1992 | Grogan et al. | 523/334 |
| 5,149,591 A | 9/1992 | Patitsas et al. | 428/423.1 |
| 5,186,978 A | 2/1993 | Woodhall et al. | 427/154 |
| 5,240,056 A | 8/1993 | Kansupada et al. | 152/524 |
| 5,342,872 A | 8/1994 | Huber | 428/294 |
| 5,837,076 A | 11/1998 | Huber et al. | 152/524 |
| 5,981,646 A | * 11/1999 | Huber et al. | 524/503 |

FOREIGN PATENT DOCUMENTS

| | | | |
|---|---|---|---|
| CA | 2052572 | | 4/1992 |
| JP | 4618251 B | * | 5/1971 |
| JP | 64-171 | | 6/1987 |

* cited by examiner

*Primary Examiner*—Edward J. Cain
*Assistant Examiner*—Katarzyna W. Lee
(74) *Attorney, Agent, or Firm*—Michael S. Sherrill

(57) ABSTRACT

An aqueous coating composition which can be applied to a cured rubber surface, such as the white sidewall, colored sidewall, raised white lettering or raised colored lettering of a tire, to provide a protective coating against staining and scuffing. The composition includes (a) polyvinyl alcohol, (b) ethylene-vinyl acetate copolymer, and (c) one or both of (i) a silicon emulsion in an amount sufficient to provide increased scuff resistance to a coating prepared from the composition, and (ii) a thickening agent of a type and in an amount effective to render the composition shear-thinning.

35 Claims, No Drawings

PROTECTIVE COATING FOR TIRE SIDEWALLS AND METHOD FOR PROTECTING TIRE SIDEWALLS

This application claims the benefit of provisional patent application Serial No. 60/100,636 filed Sep. 16, 1998.

FIELD OF THE INVENTION

The present invention relates to a protective coating for tire sidewalls and method for protecting tire sidewalls.

BACKGROUND OF THE INVENTION

Tires having white sidewalls and/or raised white lettering, achieved by the addition of a white dye or pigment such as titanium dioxide, are popular in the United States and Canada. Colors other than white that contrast with the typical black-colored remainder of the tire can, of course, also be used on tire sidewalls for aesthetic purposes. The sidewalls of such tires are normally coated with protective paints or coatings after being manufactured to protect the colored sidewall and/or colored lettering on the tire while it is being shipped and stored prior to being mounted on a vehicle. The protective coating is removed from the sidewall of the tire after it is mounted on the vehicle.

The general purpose of such a protective coating is to inhibit or prevent migration of chemicals to the tire rubber composition from the surface of an adjacent black-colored tire during transportation and storage which would otherwise tend to stain and, thus, discolor the rubber. Staining caused by migration of chemicals upon contact from an adjacent tire usually becomes evident after exposure of the contacted rubber surface to ultraviolet light such as sunlight. Such contact staining phenomenon. is well known.

Rubber tires are typically black in color due to the carbon black reinforcement contained therein. If a contrasting or other color is desired for a part of the tire, a coloring pigment is used rather than carbon black. Many compounding ingredients typically used in rubber formulations are of the staining type; namely, amine-based antidegradants and aromatic rubber processing oils. These chemicals tend to migrate to the surface of the rubber and may stain or discolor the rubber surface of another article which contacts it for a period of time, particularly after the contacted rubber is exposed to ultraviolet light.

Often, a polyvinyl alcohol (PVA) based coating is used to protect the contrastingly colored rubber surfaces from other rubber surfaces of the staining type because the polyvinyl alcohol itself tends to be a barrier for the migration of such staining material. Moreover, the PVA can normally be easily removed from the coated rubber surface, when and if desired, by simple water-washing, usually with a soap solution, since the PVA itself normally has a relatively high degree of water solubility, particularly when the water contains a surfactant. Thus, the PVA coat is typically used for storage and shipping conditions and is usually removed by water-washing by the user. The PVA coating is normally used in conjunction with (mixed with) a plasticizer so that the resulting PVA-based coating has a degree of flexibility.

Tires are often stored under varying circumstances for various purposes so that they may be in contact with each other for a period of time such as, for example, storage during their shipping or transportation to various locations and warehouse storing. The storage conditions can vary considerably and sometimes the tires are stored under relatively high humidity conditions and sometimes at elevated temperatures.

Under such circumstances, where the tire surface has a PVA-based coating thereon, it has been observed that, under relatively high humidity conditions, the PVA-based coatings soften and easily scuff or abrade away, particularly as one tire may rub against another during shipment, thereby leaving a portion of the contrastingly colored sidewall unprotected and susceptible to chemical contact migration staining from other adjacent and contacting rubber products, including tires. At elevated temperatures, the aforesaid staining ingredients have a greater tendency to migrate to the surface of its host cured rubber product and, consequently, contribute to the staining of an adjacent and contacting rubber surface which is contrastingly light colored—even through many conventional protective barrier coatings (including PVA-based coatings).

Attempts have been made to provide a coating composition and a resultant coated rubber product, particularly a coated tire sidewall rubber surface, which will retard, inhibit and/or prevent the migration of amine-based antidegradants and aromatic rubber processing oils onto the rubber sidewall surfaces, such as a white sidewall, from an adjacent and contacting black rubber surface. For example, U.S. Pat. Nos. 5,137,070 and 5,240,056 to Kansupada et al. describe protective coatings for the white sidewalls on tires based on polyvinyl alcohol, and including a monovalent water-soluble salt of methylvinylether/maleic acid copolymer and a plasticizer. U.S. Pat. No. 4,911,218 to Patitsas describes a coating prepared from polyvinyl alcohol and mica or glass, and U.S. Pat. No. 5,149,591to Patitsas et al. describes a coating prepared from a blend of polyvinyl alcohol and water-dispersed polyurethane.

U.S. patent application Ser. No. 08/933,453, filed on Sep. 18, 1997, discloses an aqueous polyvinyl alcohol/polyvinyl acetate-based composition comprising: (i) an aqueous mixture including polyvinyl alcohol and polyvinyl acetate, wherein the weight ratio of polyvinyl alcohol to polyvinyl acetate is provided between about 15:85 to about 40:60 and (ii) an anti-scuff agent, such as a silicon emulsion, in an amount sufficient to provide increased scuff resistance for a coating prepared from the composition.

While such compositions are generally effective for protecting the white sidewall and/or raised white lettering on a tire against chemical contact migrating staining, research continues for new cost effective compositions capable of providing satisfactory protection and ease of application.

SUMMARY OF THE INVENTION

A first aspect of the invention is an aqueous paint composition particularly useful for protecting the white sidewalls of tires. A first embodiment of the composition includes (i) an aqueous mixture of polyvinyl alcohol and an ethylene/vinyl acetate copolymer, and (ii) a silicon emulsion in an amount sufficient to provide increased scuff resistance to a coating prepared from the composition. A second embodiment of the composition includes (i) an aqueous mixture including polyvinyl alcohol and an ethylene/vinyl acetate copolymer, and (ii) a thickening agent of a type and in an amount effective to render the composition shear-thinning (i.e., plastic or pseudoplastic). A third embodiment of the composition combines the components of the first and second embodiments, and includes (i) an aqueous mixture including polyvinyl alcohol and an ethylene/vinyl acetate copolymer, (ii) a silicon emulsion in an amount sufficient to provide increased scuff resistance to a coating prepared from the composition, and (iii) a thickening agent of a type and in an amount effective to render the composition shear-thinning.

The paint compositions offer a number of advantages over other known compositions, including (i) a decreased tendency to clog paint spray heads, (ii) less of a tendency to smear under conditions of high humidity, and (iii) ability to withstand cracking under conditions of low humidity.

A second aspect of the invention is a pneumatic tire wherein the white sidewall or white lettering thereon is protectively coated with one of the aqueous paint compositions described above.

A third aspect of the invention is a method of protecting the white sidewall or white lettering on a pneumatic tire against staining by applying a coating of one of the aqueous paint compositions described above over the white sidewall or white lettering.

DETAILED DESCRIPTION OF THE INVENTION INCLUDING A BEST MODE

The present invention relates to an aqueous coating composition which can be applied to a cured rubber surface, such as the white sidewall, colored sidewall and/or raised white lettering of a tire, to provide a protective coating against staining and scuffing.

Definitions

The aqueous coating composition can be referred to as an aqueous composition or a paint, or more simply as "the composition." Once it is applied to a substrate and cured and/or dried, it can be referred to as a protective coating or more simply as "the coating." It should be understood that, while the phrase "the coating" is intended to refer to the dried state, it need not exclude moisture completely. That is, it is meant to include moisture as a result of atmospheric humidity.

Composition

The composition of the present invention contains substantial amounts of (a) polyvinyl alcohol, (b) ethylene-vinyl acetate copolymer, and (c) one or both of (i) a silicon emulsion in an amount sufficient to provide increased scuff resistance to a coating prepared from the composition, and (ii) a thickening agent of a type and in an amount effective to render the composition shear-thinning.

The composition provides a protective coating having excellent stain resistance, scuff resistance, low humidity resistance and flexibility. The composition can be evenly coated upon the sidewall of a cured rubber tire, even when the tire sidewall contains residual lubricant from tire processing, without the formation of craters the resultant coating will strongly adhere to the tire yet can be readily water washed from the tire when desired.

The coating should possess sufficient flexibility so that significant cracking does not occur. Significant cracking allows staining chemicals to penetrate the coating and cause staining.

The coating should also provide low humidity resistance, such that at relative humidity levels of about 13 percent the coating does not significantly crack.

POLYVINYL ALCOHOL

The polyvinyl alcohol component generally has the repeating structure —$CH_2CHOH$—. Polyvinyl alcohol is commercially available and is well known to the art and literature, and is typically made by the alcoholysis of polyvinyl acetate (PVAC) which generally has the repeating structure —$CH_2CH(COOCH_3)$—. For purposes of the invention, the polyvinyl alcohol component should have a weight average molecular weight which is within the range of about 22,000 to about 250,000, depending on the grade of the polymer. It is generally recognized that, as the molecular weight decreases, the water solubility increases. Thus, the preferred weight average molecular weight range is from about 84,000 to about 110,000 to ensure adequate solubility, and the preferred number average molecular weight is in the range of about 22,000 to about 50,000. It should be understood that, by lowering the molecular weight of the polyvinyl alcohol component, increased flexibility or pliability in the coating can be achieved.

Because polyvinyl alcohol is often prepared by alcoholysis of polyvinyl acetate, commercially available polyvinyl alcohol often contains residual amounts of polyvinyl acetate. In commercially available polyvinyl alcohol, it is believed that the polyvinyl acetate content may range between 0.5 and 20 percent by weight based on the dry weight. This residual polyvinyl acetate is present in significantly lower amounts than required by the aqueous coating composition of the invention. Exemplary sources of polyvinyl alcohol which can be used in the invention are described in U.S. Pat. Nos. 5,137,070 and 5,240,056 to Kansupada et al., the disclosures of which are incorporated by reference in their entirety.

The composition should include sufficient amounts of polyvinyl alcohol, in combination with the other constituents, to provide barrier properties to staining, flexibility and low humidity resistance. Generally, this corresponds to an amount of polyvinyl alcohol of at least about 15 percent by weight, preferably between about 20 to about 30 percent by weight, and more preferably between about 23 to about 28 percent by weight, all based on the dry weight of the composition.

ETHYLENE VINYL ACETATE

Ethylene vinyl acetate copolymers useful in the present invention are commercially available and are generally formed by the copolymerization of ethylene and vinyl acetate with a peroxide catalyst. Airflex™ 300 is an ethylene vinyl acetate copolymer commercially available from Air Products which is highly preferred for utilization in the coating formulations of this invention. Airflex™ 300 has a viscosity of 1700–1800 cps, a pH of 4 to 5 and a glass transition temperature ($T_g$) of about 17° C. The ethylene vinyl acetate copolymer should have a bound ethylene content of less than about 25 weight percent, preferably between about 5 to about 20 weight percent, and most preferably between about 5 to about 15 weight percent.

The composition includes ethylene vinyl acetate copolymer to provide improved flexibility and humidity resistance to the coating. The ethylene vinyl acetate copolymer is a water-dispersible molecule that is provided in a sufficient amount to increase adhesion between the composition and the rubber tire sidewall. This corresponds to an amount of ethylene vinyl acetate copolymer of at least 65 percent by weight, preferably between about 70 to about 99 percent by weight, more preferably between about 85 to about 95 percent by weight, and most preferably between about 88 to about 92 percent by weight, all based on the solids weight.

The composition can contain a small amount of vinyl acetate homopolymer.

RELATIVE AMOUNTS OF POLYVINYL ALCOHOL AND ETHYLENE VINYL ACETATE COPOLYMER

The ratio of polyvinyl alcohol to ethylene vinyl acetate copolymer in the compositions can vary depending on the desired properties. For example, as the amount of polyvinyl alcohol in the emulsion is increased, the composition has increased stain resistance but decreased scuff resistance, particularly under conditions of high humidity. In contrast, as the amount of ethylene vinyl acetate copolymer in the emulsion:is increased, the composition provides increased humidity resistance. However, if too much ethylene vinyl acetate copolymer is added to the composition, the composition may become too difficult to remove from rubber tires.

In order to provide the desired properties of adhesiveness, stain resistance, scuff resistance and humidity resistance, it is preferred that the-composition contain a dry weight ratio of polyvinyl alcohol to ethylene vinyl acetate copolymer of from about 15:85 (respectively) to about 40:60 (respectively). Preferably, the polyvinyl alcohol and ethylene vinyl acetate copolymer are present in a weight ratio of between about 20:80 (respectively) to about 30:70 (respectively).

ANTI-SCUFF AGENT

The scuff resistance and high humidity resistance of the composition can be improved by the addition of an anti-scuff agent. Scuff resistance is important so that the coating does not easily abrade away which would result in exposure of the rubber surface to staining chemicals. High humidity resistance is important, particularly during the summer months when increased humidity tends to soften polyvinyl alcohol-based coatings, such as those described in the prior art.

The scuff resistance and high humidity resistance of the composition can be significantly improved by the incorporation of an anti-scuff agent. Preferred anti-scuff-agents are silicones or polysiloxanes such as polydimethyl siloxane. A family of suitable silicones is available from GE Silicones (General Electric Company, Waterford, N.Y.) and can be referred to as mold release agents and general purpose release agents because of their good lubricity. Such silicones are effective for enhancing the scuff resistance of a coating formed from the composition without adversely interfering with the adhesiveness of the coating. Preferably, the scuff resistance of the coating can be improved by at least three times, and more preferably by at least six times, by incorporating an effective amount of an anti-scuff agent. It should be appreciated that this increase in scuff resistance can be measured according to the procedure described herein.

When the anti-scuff agent is a silicone emulsion, it has been found that it can be used at a concentration of 2 to 5 percent by weight, and more preferably 3 to 4 percent by weight, based on the total weight of the composition. It should be appreciated that the silicone emulsion provided in the above range is a water-based emulsion containing between 50 and 60 percent solids. Thus, the amount of silicone emulsion can be adjusted based on the solids content of the emulsion used. Exemplary GE Silicone emulsions useful in the invention are available under the names SM2140™, SM2163™ and SM2164™. These are silicone emulsions based on polydimethyl siloxane having a viscosity of less than about 20,000 Centistokes, with a preferred viscosity range of between about 200 to about 1,000 Centistokes and between about 8,000 to about 12,000 Centistokes.

While not desiring to be bound by theory, it is believed that polysiloxanes are effective as anti-scuff agents and do not interfere with the adhesion of the coating to the sidewall of a tire because the polysiloxane rises to the surface of the coating as the coating dries. Consequently, the protective coating has an oily surface which is less likely to "grab" onto a neighboring tire that comes in contact with the coating. Accordingly, it should be appreciated that any similarly functioning component can be characterized as an anti-scuff agent.

One is cautioned against adding too much polysiloxane, as an excessive concentration could deteriorate the coating adhesiveness and adversely impact the stain resistance of the coating.

It should additionally be appreciated that the anti-scuff agents of the present invention provide improved scuff resistance even under conditions of high humidity. In the case of polysiloxane anti-scuff agents, this feature is believed to be the result of the formation of a water barrier at the surface of the coating, effectively isolating the hygroscopic polyvinyl alcohol from the humidity.

THICKENING AGENT

The ability of the coating to adhere to a surface, such as a tire-sidewall, without running or dripping can be improved by incorporating a thickening agent into the composition. An exemplary thickening agent is xanthan gum (polysaccharide B-1459). Of particular interest are those thickening agents effective for transforming the composition into a shear-thinning system having plastic or pseudoplastic flow characteristics, such as a liquid clay (e.g., smectite or bentonite). Without intending to be unduly limited thereby, it is believed that transformation of the composition into a shear-thinning composition by the addition of an appropriate type and amount of thickening agent facilitates spray application of the composition by allowing the target application viscosity to be reached (i.e., the viscosity necessary to allow coating without running or dripping) with a reduced viscosity of the composition at the high-shear spray heads. Such reduced viscosity at the spray heads is believed to reduce clogging of the spray heads.

The desired viscosity can generally be achieved by the incorporation of about 0.1 to about 0.5 percent by weight, preferably about 0.1 to about 0.2 percent by weight, thickening agent based upon the total weight of the composition. The desired transformation of the composition to a shear-thinning system can generally be achieved by the incorporation of about 0.2 to about 2 percent by weight on a dry a basis, preferably about 0.3 to about 1 percent by weight on a dry basis, suitable thickening agent based upon the total weight of the composition.

PLASTICIZER

The coating composition preferably includes a plasticizer to provide increased flexibility for the coating. Preferably, the plasticizer does not adversely effect or degrade-the barrier properties of the protective coating composition, at least not substantially. When a plasticizer is used, it is preferably used in an amount of between about 0.5 and about 5 percent by weight, based on the solids weight, and more preferably between about 1 and about 3 percent by weight, based on the solids weight. Exemplary plasticizers which can be used include ethylene glycol, glycerin, polyglycerol and urea.

ADDITIONAL ADDITIVES

Surfactant

The composition can optionally contain a surfactant to enhance compatibility of the coating with a tire surface. It is understood that the surfactant decreases the surface tension of the aqueous composition so that the composition will not form craters if a contaminant, such as residual lubricant from tire processing, is present on the sidewall. In this context, it can also be referred to as a wetting agent. In addition to enhancing application of the composition to the surface of the tire, a surfactant improves the sprayability of the coating composition. In addition, the surfactant can be provided to reduce foaming. Exemplary surfactants which can be used include anionic surfactants, cationic surfactants, nonionic surfactants and mixtures thereof. It should be appreciated that nonionic surfactants are preferred because they generally provide better stability of the composition. Surfactants which cause foaming are not desired-because they may tend to leave imperfections in the resulting coating due to poor coverage.

An additional requirement of the surfactant and of all components of the protective coating composition generally is that they do not stain the white sidewalls. A particularly preferred class of surfactant is an acetylenic diol, such as SURFYNOL™504 (ethoxylated tetramethyl decynediol), available from Air Products & Chemicals, Inc. of Allentown, Pa. While the amount of surfactant added to the protective coating composition can vary depending on the specific surfactant used, in most situations, it is believed that the composition should contain from about 0.1 to about 1.0 percent by weight, and preferably from about 0.4 to about 1.0 percent by weight surfactant, based on the total weight of the composition.

Pigment

The composition may also include a pigment of a contrasting color so as to facilitate visual observation of the protective coating once applied to a tire. Suitable pigments include specifically, but not exclusively, blue pigments such a phthalocyan. An exemplary blue pigment is available as Tricosol™ Blue No 17732 from Tricon Colors, Inc.

Biocide

The composition may further contain a biocide to prevent the growth of fungus of bacteria on the coating. A preferred biocide is a broad spectrum fungicide; such as, 3-iodo-2-propyl butyl carbamate which is available from Troy Corp. of East Hanover, N.J., under the name POLYPHASE AF1™. Other water-based fungicides which are known in the art can also be used.

pH Adjusting Agent

It should be appreciated that the pH of the composition is preferably adjusted away from the extremes of an acid or base so as not to cause injury if contacted with human flesh. Accordingly, it is preferred that the pH of the composition be between about 3 and about 10, more preferably-between about 5 and about 8.

Solids Content

Certain properties of a coating produced from the composition are related to the weight percentage of the composition attributable to the polyvinyl alcohol polymer, ethylene vinyl acetate copolymer and plasticizer (hereinafter referenced as the compositional solids content). As a general rule, as the compositional solids content increases, the composition becomes more difficult to spray coat onto a substrate at a uniform thickness but dries quicker after application.

The compositional solids content can be adjusted to provide the desired flow properties. For example, when the composition is to be applied by spray application the composition preferably has a solids content of between about 25 to about 50 percent by weight, and more preferably between about 30 to about 40 percent by weight, based on the total weight of the composition. It is particularly preferred that the compositional solids content be about 36 percent by weight for spray application. One skilled in the art would readily appreciate how the compositional solids content of the composition can be adjusted for various applications.

The preferred formulation of the first embodiment of the protective coating composition is provided in Table 1 where the weight percentages are based on the total weight of the composition.

TABLE 1

Protective Coating Composition (First Embodiment)

| COMPOSITION | PREFERRED (wt %) | MOST PREFERRED (wt %) |
|---|---|---|
| PVA/EVAc and Plasticizer Solids | 20–50 | 30–40 |
| Anti-scuff agent | 2–6 | 3–5 |
| Pigment | 0.01–0.1 | 0.01–0.05 |
| Biocide | 0.1–1.0 | 0.1–0.5 |
| Thickening Agent | 0.1–0.5 | 0.1–0.2 |
| Surfactant | 0.1–1.0 | 0.1–0.5 |
| Water | Balance | Balance |

The preferred formulation of the second embodiment of the protective coating composition is provided in Table 2 where the weight percentages are based on the total weight of the composition.

TABLE 2

Protective Coating Composition (Second Embodiment)

| COMPOSITION | PREFERRED (wt %) | MOST PREFERRED (wt %) |
|---|---|---|
| PVA/EVAc and Plasticizer Solids | 20–50 | 30–40 |
| Pigment | 0.01–0.1 | 0.01–0.05 |
| Biocide | 0.1–1.0 | 0.1–0.5 |
| Thickening Agent Solids | 0.2–2.0 | 0.3–1.0 |
| Surfactant | 0.1–1.0 | 0.1–0.5 |
| Water | Balance | Balance |

The preferred formulation of the third embodiment of the protective coating composition is provided in Table 3 where the weight percentages are based on the total weight of the composition.

TABLE 3

Protective Coating Composition (Third Embodiment)

| COMPOSITION | PREFERRED (wt %) | MOST PREFERRED (wt %) |
|---|---|---|
| PVA/EVAc and Plasticizer Solids | 20–50 | 30–40 |
| Anti-scuff agent | 2–6 | 3–5 |
| Pigment | 0.01–0.1 | 0.01–0.05 |
| Biocide | 0.1–1.0 | 0.1–0.5 |
| Thickening Agent Solids | 0.2–2.0 | 0.3–1.0 |
| Surfactant | 0.1–1.0 | 0.1–0.5 |
| Water | Balance | Balance |

Method of Making

The composition can be conveniently produced by (i) dispersing the thickener(s) in the water, holding back approximately 5–10 wt % of the theoretically calculated water necessary to achieve the desired solids content and viscosity, to form a premix, (ii) blending together the PVA, EVAc, plasticizer, silicone, defoamer and predispersed dye, (iii) introducing the premix into the blend to form a thickened blend, and then (iv) introducing the biocide and surfactant. The solids content and viscosity of the resultant composition can then be measured utilizing standard lab equipment and the target ranges of each achieved by blending in an appropriate amount of the withheld water.

Method of Use

APPLYING

The composition can be applied by brushing, roll coating, spraying, swabbing, or any other means normally utilized for the application of paints. Once the composition is applied, the water present therein is allowed to evaporate which causes the composition to dry and form a protective coating.

REMOVING

The coating can be removed by application of a water wash. In accordance with conventional practices, the coating can conveniently be removed from the sidewall of a pneumatic tire by washing with warm water once the tires are mounted on a vehicle.

The advantages of this invention are more particularly shown by the following examples in which the parts and percentages are by weight unless otherwise indicated. It should be understood that the following examples further illustrate, but do not limit, the invention.

EXAMPLES

Testing Procedures

The test methods used to measure scuff resistance, contact stain, flexibility and high humidity resistance reported herein are set forth below.

Samples for testing (hereinafter "standard test samples") were prepared by taking a cured and cleaned 6" by 6" (15.2 cm by 15.2 cm) white sidewall sheet. The cured sheet is placed in an oven at 60° C. for 15 minutes. The heated sheet is removed and the composition to be tested is drawn thereover with a draw bar to provide a 6 mil (0.152 mm) wet film. The wet coated sample is placed in an oven at 60° C. for 5 minutes. The dry coated sample is removed and cooled for 30 minutes. The cooled 6" by 6" dry coated sample is then cut into 1" by 6" strips (2.54 cm by 15.2 cm) for testing. The prepared coating generally has a thickness of between 1.5 to 2.2 mil (0.038 to 0.056 mm).

SCUFF RESISTANCE AND AGED SCUFF RESISTANCE TESTING PROTOCOL

Scuff resistance is evaluated by rubbing a 4" by 4" by 0.5" (10.2 cm by 10.2 cm by 1.3 cm) tread block against the coating of a standard test sample at a 45° angle with moderate pressure. The number of strokes required to remove the coating under the tread block was measured.

Coatings that can withstand at least 20 strokes immediately after drying and being cooled to room temperature, pass the scuff resistance test. Preferred coatings can withstand at least 30 strokes, while most preferred coatings can withstand 40 strokes.

Coatings that can withstand at least 20 strokes after aging for one week at room temperature, pass the aged scuff resistance test.

HIGH HUMIDITY SCUFF RESISTANCE TESTING PROTOCOL

High humidity resistance is evaluated by conditioning a standard test sample. at 86° F. (30° C.) and 92% relative humidity for 2 hours. The conditioned sample is then removed and immediately rub-tested with a 4" by 4" by 0.5" (10.2 cm by 10.2 cm by 1.3 cm) tread block. Coatings that can withstand at least 2 strokes pass the high humidity scuff resistance test.

STAIN RESISTANCE TESTING PROTOCOL

Stain resistance is evaluated by placing a 1"×1" (2.54 cm by 2.54 cm) black sidewall strip on the coated side of a standard test sample, placing a 1-pound (0.45 kg) weight on the black sidewall strip, and then heating the weighted combination in an oven at 70° C. for 24 hours. The treated sample is then removed from the oven, washed with water and dried at room temperature. The treated sample, along with an untreated control sample cut from the same 6" by 6" white sidewall sheet, is then exposed to UV light for 2 hours in a Canadian Stain tester. Reflectance is measured by the Canadian Stain tester for both the treated and untreated (control) sample. A coating capable of maintaining 90% of the original reflectance value, as determined by dividing the reflectance of the treated sample by the reflectance of the control sample and multiplying the quotient by 100, passes the stain resistance test.

FLEXIBILITY AND DRY FLEXIBILITY TESTING PROTOCOL

Flexibility is evaluated by bending a standard test sample 180 degrees around a ¼" (6.3 mm) pencil at room temperature with the coated side facing out. The sample is then allowed to return to a planar condition and the sample inspected for cracks.

Dry Flexibility is evaluated by placing a standard test-sample in a desiccator, set at 13% relative humidity, for 24 hours and then bending the sample 180 degrees around a ¼" (6.3 mm) pencil with the coated side facing out. The sample is then allowed to return to a planar condition and the sample inspected for cracks.

Glossary

The following acronyms, abbreviations, and trade names are used throughout the Examples.

| TRADENAME/ ACRONYM | DESCRIPTION | |
|---|---|---|
| | Full Name | Type |
| Airflex ™ 300 (Airflex) | Ethylene Vinyl Acetate Copolymer | An ethylene vinyl acetate copolymer purchased from Air Products Polymers L.P. having a viscosity of 1,800 to 2,700 cps and containing 55 wt % solids. |
| Airvol ™ 21-205 (Airvol) | Polyvinyl Alcohol | A polyvinyl alcohol purchased from Air Products and Chemicals Incorporated having a weight average molecular weight of 31,000 to 50,000, a degree of polymerization of 350 to 650 and containing 21 wt % solids. |
| Benzoflex ™ 50 (Benzoflex) | Diethylene glycol dibenzoate and dipropylene glycol dibenzoate | A plasticizer purchased from Velsicol Chemical Corporation. |
| Rhodoline ™ 675 (Rhodoline) | | A defoamer (formerly known as Colloid 675) purchased from Rhodia (formerly known as Rhone-Poulenc). |
| EVAc | Ethylene Vinyl Acetate Copolymer | |

-continued

| TRADENAME/ ACRONYM | DESCRIPTION | |
|---|---|---|
| | Full Name | Type |
| Permont ™ SX-10A (Permont) | Aqueous Bentonite Slurry | A shear-thinning thickening agent purchased from Southern Clay Products, Incorporated containing 10 wt % solids. |
| Polyphase ™ AF-1 (Polyphase) | Broad Spectrum Nonmetallic Fungicide | A fungicide purchased from Troy Chemical. |
| PVA | Polyvinyl Alcohol | — |
| PVAc | Polyvinyl Acetate | — |
| SM2140 ™ | Silicone Emulsion | A silicone anti-scuff agent purchased from General Electric Company through Harwick Chemicals of Akron, Ohio. |
| Surfynol ™ 504 (Surfynol) | Acetylenic Diol | A surfactant purchased from Air Products and Chemicals Incorporated. |
| Tricosol ™ 17732 (Tricosol) | Phthalocyanine | A blue dye purchased from Tricon Colors, Inc. |
| WD3806 | Polyvinyl Alcohol | A polyvinyl alcohol purchased from H B Fuller Company containing 38 wt % solids |
| TICaxan | Xanthan Gum | A thickening agent available from a number of sources including TIC Gums and Archer Daniels Midland. |
| XR5832HS | Polyvinyl Acetate containing plasticizer | A polyvinyl acetate purchased from H B Fuller Company containing 55–57 wt % solids and up to 3 wt % plasticizer. |

Comparative Example A

Into a beaker containing water in the amount set forth in Table 4 and under sufficient agitation to form a vortex, was slowly added Xanthan gum of the type and in the amount set forth in Table 4, to form a premix. The premix was agitated for 10 minutes to ensure uniform dispersion of the Xanthan gum as set aside.

Into a separate mixing vessel was placed an emulsion of polyvinyl alcohol and polyvinyl acetate of the type and in the amounts set forth in Table 4, to form a latex masterbatch. Into the latex masterbatch was added a predispersed blue pigment of the type and in the amount set forth in Table 4. The pigmented latex was mixed for 10 minutes and then a biocide was added of the type and in the amount set forth in Table 4. The biocide-containing pigmented latex was then mixed for 15 minutes and the premix added. The thickened latex was mixed for 20 minutes and then a surfactant, of the type and in the amount set forth in Table 4, was added to form the final composition. The final composition was gently mixed for an additional 10 minutes after addition of the surfactant, while avoiding excessive agitation.

Example 1

Into a beaker containing water in the amount set forth in Table 4 and under sufficient agitation to form a vortex, was slowly added xanthan gum of the type and in the amount set forth in Table 4. The xanthan gum dispersion was agitated for several minutes to ensure uniform dispersion of the xanthan gum and then clay, of the type and in the amount set forth in Table 4, was added to the dispersion to form a premix. The premix was agitated for several minutes to ensure uniform dispersion of the clay and then set aside.

Into a separate mixing vessel was sequentially placed, while under constant agitation, ethylene vinyl acetate copolymer, defoamer, plasticizer, polyvinyl alcohol, silicone and predispersed dye, all of the type and in the amounts set forth in Table 4, to form a latex masterbatch. Into the latex masterbatch was then added the premix. The thickened latex was mixed for several minutes and then a biocide and a surfactant, of the type and in the amount set forth in Table 4, were added to form the final composition. The final composition was gently mixed for an additional several minutes, while avoiding excessive agitation.

The scuff resistance, contact stain and flexibility of the composition was tested in accordance with the testing protocols set forth herein, with the results reported below.

| | |
|---|---|
| Scuff Resistance | Pass |
| Aged Scuff Resistance | Pass |
| High Humidity Scuff Resistance | Pass |
| Contact Stain | Pass |
| Flexibility | No Cracking Observed |
| Low Humidity Flexibility | No Cracking Observed |

TABLE 4

Protective Composition Formulations

COMPONENT

| EXAMPLE | $H_2O$ wt % | PVA Type/ wt % | PVAc Type/ wt % | EVAc Type/ wt % | Thickener Type/ wt % | Plasticizer Type/ wt % | Silicone Type/ wt % | Biocide Type/wt % | Surfactant Type/wt % | Defoamer Type/wt % | Dye Type/wt % |
|---|---|---|---|---|---|---|---|---|---|---|---|
| A | 32.88 | WD3806 15.36 | XR5832HS 46.21 | — | TICaxan 0.17 | † Glycerine 0.63 | SM-2140 4.10 | Polyphase 0.47 | Surfynol 0.14 | | Tricosol 0.04 |
| 1 | 16.66 | Airvol 25.52 | — | Airflex 42.54 | TICaxan 0.15 Permont 5.35 | Glycerine 1.00 Benzoflex 4.03 | SM-2140 4.08 | Polyphase 0.46 | Surfynol 0.14 | Rhodoline 0.02 | Tricosol 0.05 |

† XR5832HS contains up to about 3 wt % plasticizer, based upon the total weight of the XR5832HS.

Spray Test

The compositions of Example A (PVA/PVAc) and Example 1 (PVA/EVAc) were each continuously sprayed through a spray system of the type conventionally utilized to spray a protective coating onto the sidewall of pneumatic tires. The PVA/PVAc composition of Example A plugged after 1–2 hours of use and required cleaning. The PVA/EVAc composition of Example 1 functioned for 3–4 hours without plugging.

As demonstrated by this test, the PVA/EVAc composition of the present invention is of significant commercial value as tire plants can spray the composition utilizing standard spray equipment for much longer periods of time without cleaning. This translates to a reduced labor cost.

What is claimed is:

1. An aqueous paint composition useful for protecting the white sidewalls of tires, comprising:
   (a) an aqueous mixture including polyvinyl alcohol and an ethylene/vinyl acetate copolymer wherein the solids content of aqueous mixture includes greater than about 65%; by weight ethylene/vinyl acetate copolymer; and
   (b) a silicon emulsion in an amount sufficient to provide increased scuff resistance to a coating prepared from the composition.

2. An aqueous paint composition useful for protecting the white sidewalls of tires, comprising:
   (a) an aqueous mixture including polyvinyl alcohol and an ethylene/vinyl acetate copolymer wherein the solids content of the aqueous mixture includes greater than about 65%; by weight ethylene/vinylacetate copolymer; and
   (b) a thickening agent of a type and in an amount effective to render the composition shear-thinning.

3. The aqueous paint composition of claim 2 further comprising a silicon emulsion in an amount sufficient to provide increased scuff resistance to a coating prepared from the composition.

4. The aqueous paint composition of claim 2 wherein the thickening agent is a clay.

5. The aqueous paint composition of claim 3 wherein the thickening agent is a clay.

6. The aqueous paint composition of claim 5 wherein the clay is a bentonite.

7. The aqueous paint composition of claim 1 wherein the polyvinyl alcohol and ethylene/vinyl acetate copolymer are present at a weight ratio of polyvinyl alcohol to ethylene/vinyl acetate copolymer of between about 15:85 and 40:60.

8. The aqueous paint composition of claim 2 wherein the polyvinyl alcohol and ethylene/vinyl acetate copolymer are present at a weight ratio of polyvinyl alcohol to ethylene/vinyl acetate copolymer of between about 15:85 and 40:60.

9. The aqueous paint composition of claim 1 wherein the silicone emulsion contains polydimethyl siloxane.

10. The aqueous paint composition of claim 3 wherein the silicon emulsion has a viscosity of less than about 20,000 Centistokes.

11. The aqueous paint composition of claim 3 wherein the aqueous mixture further comprises a plasticizer present in an amount within the range of about 0.5 percent to about 5 percent by weight based upon solids.

12. The aqueous paint composition of claim 1 wherein the aqueous mixture has a solids content in the range of about 20 percent to about 50 percent by weight.

13. The aqueous paint composition of claim 2 wherein the aqueous mixture has a solids content in the range of about 20 percent to about 50 percent by weight.

14. The aqueous paint composition of claim 1 wherein the silicone emulsion is present in an amount of between about 2 to about 6 percent by weight, based on the total weight of the aqueous mixture.

15. The aqueous paint composition of claim 12 wherein the aqueous mixture has a pH of between about 5 and about 8.

16. An article comprising:
   (a) a pneumatic tire having a white sidewall or white lettering thereon; and
   (b) a protective coating over the white sidewall or white lettering comprising a dry coating of the aqueous paint composition of claim 1.

17. An article comprising:
   (a) a pneumatic tire having a white sidewall or white lettering thereon; and
   (b) a protective coating over the white sidewall or white lettering comprising a dry coating of the aqueous paint composition of claim 2.

18. An article comprising:
   (a) a pneumatic tire having a white sidewall or white lettering thereon; and
   (b) a protective coating over the white sidewall or white lettering comprising a dry coating of the aqueous paint composition of claim 3.

19. An article comprising:
   (a) a pneumatic tire having a white sidewall or white lettering thereon; and
   (b) a protective coating over the white sidewall or white lettering comprising a dry coating of the aqueous paint composition of claim 4.

20. An article comprising:
   (a) a pneumatic tire having a white sidewall or white lettering thereon; and
   (b) a protective coating over the white sidewall or white lettering comprising a dry coating of the aqueous paint composition of claim 6.

21. An article comprising:
   (a) a pneumatic tire having a white sidewall or white lettering thereon; and
   (b) a protective coating over the white sidewall or white lettering comprising a dry coating of the aqueous paint composition of claim 7.

22. An article comprising:
   (a) a pneumatic tire having a white sidewall or white lettering thereon; and
   (b) a protective coating over the white sidewall or white lettering comprising a dry coating of the aqueous paint composition of claim 11.

23. An article comprising:
   (a) a pneumatic tire having a white sidewall or white lettering thereon; and
   (b) a protective coating over the white sidewall or white lettering comprising a dry coating of the aqueous paint composition of claim 14.

24. A method of protecting a white sidewall or white lettering on a pneumatic tire against staining, comprising:
   (a) obtaining a pneumatic tire having a white sidewall or white lettering thereon; and
   (b) applying over the white sidewall or white lettering a coating of the aqueous paint composition of claim 1.

25. A method of protecting a white sidewall or white lettering on a pneumatic tire against staining, comprising:
   (a) obtaining a pneumatic tire having a white sidewall or white lettering thereon; and
   (b) applying over the white sidewall or white lettering a coating of the aqueous paint composition of claim 2.

26. A method of protecting a white sidewall or white lettering on a pneumatic tire against staining, comprising:
   (a) obtaining a pneumatic tire having a white sidewall or white lettering thereon; and (b) applying over the white sidewall or white lettering a coating of the aqueous paint composition of claim 3.

27. A method of protecting a white sidewall or white lettering on a pneumatic tire against staining, comprising:
    (a) obtaining a pneumatic tire having a white sidewall or white lettering thereon; and
    (b) applying over the white sidewall or white lettering a coating of the aqueous paint composition of claim 5.

28. A method of protecting a white sidewall or white lettering on a pneumatic tire against staining, comprising:
    (a) obtaining a pneumatic tire having a white sidewall or white lettering thereon;, and
    (b) applying over the white sidewall or white lettering a coating of the aqueous paint composition of claim 10.

29. A method of protecting a white sidewall or white lettering on a pneumatic tire against staining, comprising:
    (a) obtaining a pneumatic tire having a white sidewall or white lettering thereon; and
    (b) applying over the white sidewall or white lettering a coating of the aqueous paint composition of claim 14.

30. The method of claim 24 wherein the step of applying the aqueous paint composition comprises spraying the aqueous paint composition over the white sidewall or white lettering.

31. The method of claim 25 wherein the step of applying the aqueous paint composition comprises spraying the aqueous paint composition over the white sidewall or white lettering.

32. The method of claim 26 wherein the step of applying the aqueous paint composition comprises spraying the aqueous paint composition over the white sidewall or white lettering.

33. The method of claim 24 further comprising removing the protective coating by washing with water once the coating has served its purpose of protecting the white sidewall or white lettering.

34. The method of claim 25 further comprising removing the protective coating by washing with water once the coating has served its purpose of protecting the white sidewall or white lettering.

35. The method of claim 26 further comprising removing the protective coating by washing with water once the coating has served its purpose of protecting the white sidewall or white lettering.

* * * * *

UNITED STATES PATENT AND TRADEMARK OFFICE
CERTIFICATE OF CORRECTION

PATENT NO.     : 6,443,202 B1
DATED          : September 3, 2002
INVENTOR(S)    : Burton et al.

It is certified that error appears in the above-identified patent and that said Letters Patent is hereby corrected as shown below:

Column 1,
Line 34, replace "phenomenon." with -- phenomenon --

Column 2,
Line 29, replace "5,149,591to" with -- 5,149,591 to --

Column 3,
Line 47, replace "craters the" with -- craters. The --

Column 4,
Line 31, replace "based on:the" with -- based on the --
Line 46, replace "5to" with -- 5 to --

Column 5,
Line 5, replace "emulsion:is" with -- emulsion is --
Line 11, replace "the-composition" with -- the composition --

Column 6,
Line 50, replace "degrade-the" with -- degrade the --

Column 7,
Line 9, replace "desired-because" with -- desired because --
Line 45, replace "preferably-between" with -- preferably between --

Column 8,
Line 61, replace "5-10 wt %" with -- 5-10 wt% --

Column 9,
Line 55, replace "test sample. at" with -- test sample at --

Column 10,
Line 21, replace "100, passes-the" with -- 100, passes the --
Line 31, replace "standard test-sample" with -- standard test sample --

UNITED STATES PATENT AND TRADEMARK OFFICE
CERTIFICATE OF CORRECTION

PATENT NO. : 6,443,202 B1
DATED : September 3, 2002
INVENTOR(S) : Burton et al.

It is certified that error appears in the above-identified patent and that said Letters Patent is hereby corrected as shown below:

Column 13,
Line 15, replace "65%; by" with -- 65% by --
Line 24, replace "65%; by" with -- 65% by --
Line 65, replace "of claim 12" with -- of claim 13 --

Column 15,
Line 12, replace "thereon;," with -- thereon; --

Signed and Sealed this

Eighteenth Day of March, 2003

JAMES E. ROGAN
*Director of the United States Patent and Trademark Office*